United States Patent
Combes et al.

(10) Patent No.: US 8,251,311 B2
(45) Date of Patent: Aug. 28, 2012

(54) ATTACHMENT PYLON FOR AIRCRAFT HAVING A REAR ENGINE ATTACHMENT BEAM OFFSET FROM THE CAISSON

(75) Inventors: Stephane Combes, Buzet sur Tarn (FR); Laurent Sammito, Toulouse (FR); Michael Berjot, Toulouse (FR)

(73) Assignee: Airbus Operation SAS, Toulouse (FR)

( * ) Notice: Subject to any disclaimer, the term of this patent is extended or adjusted under 35 U.S.C. 154(b) by 333 days.

(21) Appl. No.: 12/596,501

(22) PCT Filed: Apr. 18, 2008

(86) PCT No.: PCT/EP2008/054728
§ 371 (c)(1),
(2), (4) Date: Oct. 19, 2009

(87) PCT Pub. No.: WO2008/135364
PCT Pub. Date: Nov. 13, 2008

(65) Prior Publication Data
US 2010/0127117 A1    May 27, 2010

(30) Foreign Application Priority Data
Apr. 20, 2007 (FR) ..................... 07 54605

(51) Int. Cl.
B64D 27/00 (2006.01)
(52) U.S. Cl. .......................................... 244/54
(58) Field of Classification Search ........... 244/54, 244/53 R; 248/554, 555, 556, 557; 60/796, 60/797
See application file for complete search history.

(56) References Cited

U.S. PATENT DOCUMENTS

| | | | | |
|---|---|---|---|---|
| 2,261,955 A | * | 11/1941 | Browne | 248/556 |
| 2,310,882 A | * | 2/1943 | Taylor | 248/556 |
| 4,013,246 A | * | 3/1977 | Nightingale | 244/54 |
| 5,320,307 A | * | 6/1994 | Spofford et al. | 244/54 |
| 5,725,181 A | * | 3/1998 | Hey | 244/54 |
| 5,873,547 A | * | 2/1999 | Dunstan | 244/54 |
| 5,927,644 A | * | 7/1999 | Ellis et al. | 244/54 |
| 6,296,203 B1 | * | 10/2001 | Manteiga et al. | 244/54 |

(Continued)

FOREIGN PATENT DOCUMENTS
EP    0 564 126    10/1993
(Continued)

OTHER PUBLICATIONS

U.S. Appl. No. 12/598,649, filed Nov. 3, 2009, Foyer, et al.

(Continued)

Primary Examiner — Tien Dinh
Assistant Examiner — Michael A Fabula
(74) Attorney, Agent, or Firm — Oblon, Spivak, McClelland, Maier & Neustadt, L.L.P.

(57) ABSTRACT

An engine attachment pylon for an aircraft including an intermediate piece interposed between a crossbar support and a rigid caisson, a first shear slug passing through a first interface fixing plane between the piece and the caisson, and a second shear slug passing through a second interface fixing plane between the piece and the support. Also, in side elevation, the intersection point between an axis of the pin and the plane, as well as the intersection point between an axis of the pin and the plane, are located on the common axis of two lateral thrust force collection connecting rods articulated on the crossbar.

14 Claims, 8 Drawing Sheets

U.S. PATENT DOCUMENTS

| | | | | |
|---|---|---|---|---|
| 6,347,765 | B1 * | 2/2002 | Jule et al. | 244/54 |
| 6,494,403 | B2 * | 12/2002 | Jule et al. | 244/54 |
| 6,758,438 | B2 * | 7/2004 | Brefort et al. | 244/54 |
| 7,021,585 | B2 * | 4/2006 | Loewenstein et al. | 244/54 |
| 7,108,224 | B2 * | 9/2006 | Pasquer et al. | 244/54 |
| 7,445,179 | B2 * | 11/2008 | Diochon et al. | 244/54 |
| 7,448,573 | B2 * | 11/2008 | Lafont et al. | 244/54 |
| 7,607,609 | B2 * | 10/2009 | Levert | 244/54 |
| 7,797,947 | B2 * | 9/2010 | Lafont et al. | 60/796 |
| 7,971,826 | B2 * | 7/2011 | Journade et al. | 244/54 |
| 8,061,649 | B2 * | 11/2011 | Journade et al. | 244/54 |
| 8,146,856 | B2 * | 4/2012 | Combes et al. | 244/54 |
| 8,152,094 | B2 * | 4/2012 | Foster | 244/54 |
| 2001/0025902 | A1 * | 10/2001 | Jule et al. | 244/54 |
| 2003/0066928 | A1 * | 4/2003 | Brefort et al. | 244/54 |
| 2004/0251379 | A1 * | 12/2004 | Pasquer et al. | 244/54 |
| 2004/0251380 | A1 * | 12/2004 | Pasquer et al. | 244/54 |
| 2004/0251381 | A1 * | 12/2004 | Pasquer et al. | 244/54 |
| 2005/0067528 | A1 * | 3/2005 | Loewenstein et al. | 244/54 |
| 2007/0069068 | A1 * | 3/2007 | Lafont et al. | 244/54 |
| 2007/0069069 | A1 * | 3/2007 | Diochon et al. | 244/54 |
| 2008/0169377 | A1 * | 7/2008 | Levert | 244/54 |
| 2008/0224018 | A1 * | 9/2008 | Lafont et al. | 248/554 |
| 2008/0245926 | A1 * | 10/2008 | Journade et al. | 244/54 |
| 2008/0251633 | A1 * | 10/2008 | Journade et al. | 244/54 |
| 2009/0200419 | A1 * | 8/2009 | Levert et al. | 244/54 |
| 2009/0308972 | A1 * | 12/2009 | Foster | 244/54 |
| 2009/0309005 | A1 * | 12/2009 | Foster et al. | 248/554 |
| 2010/0116926 | A1 * | 5/2010 | Combes et al. | 244/54 |
| 2010/0127117 | A1 * | 5/2010 | Combes et al. | 244/54 |
| 2010/0127118 | A1 * | 5/2010 | Combes et al. | 244/54 |
| 2010/0147997 | A1 * | 6/2010 | Martinou et al. | 244/54 |
| 2010/0170980 | A1 * | 7/2010 | Haramburu et al. | 244/54 |
| 2010/0181417 | A1 * | 7/2010 | Combes et al. | 244/54 |
| 2010/0181418 | A1 * | 7/2010 | Vauchel et al. | 244/54 |
| 2010/0181419 | A1 * | 7/2010 | Haramburu et al. | 244/54 |
| 2010/0206981 | A1 * | 8/2010 | Baillard | 244/54 |
| 2011/0001002 | A1 * | 1/2011 | Chouard et al. | 244/54 |
| 2011/0011972 | A1 * | 1/2011 | Vache | 244/54 |
| 2011/0036942 | A1 * | 2/2011 | Marche et al. | 244/54 |
| 2011/0114786 | A1 * | 5/2011 | Guillet et al. | 244/54 |
| 2011/0121132 | A1 * | 5/2011 | Crook et al. | 244/54 |
| 2011/0127368 | A1 * | 6/2011 | Penda et al. | 244/54 |
| 2011/0127371 | A1 * | 6/2011 | Takeuchi | 244/54 |
| 2011/0259997 | A1 * | 10/2011 | Marechal | 244/54 |
| 2011/0309189 | A1 * | 12/2011 | Marche | 244/54 |
| 2012/0056033 | A1 * | 3/2012 | Teulou et al. | 244/54 |

FOREIGN PATENT DOCUMENTS

| | | |
|---|---|---|
| EP | 564126 A1 * | 10/1993 |
| EP | 1 053 938 | 11/2000 |
| FR | 2 891 251 | 3/2007 |
| WO | 2007 000456 | 1/2007 |

OTHER PUBLICATIONS

U.S. Appl. No. 13/078,593, filed Apr. 1, 2011, Combes, et al.

* cited by examiner

FIG. 9

ATTACHMENT PYLON FOR AIRCRAFT HAVING A REAR ENGINE ATTACHMENT BEAM OFFSET FROM THE CAISSON

TECHNICAL FIELD

The present invention relates in general to an aircraft engine assembly, of the type comprising an engine, an attachment pylon, and an engine-mounting system provided with a plurality of engine attachments and being interposed between a rigid structure of the attachment pylon and the engine.

The invention also relates to such an aircraft engine attachment pylon.

The invention can be used on any type of aircraft equipped for example with turbojet engines or de turboprop engines.

This type of attachment pylon, also known as "EMS" ("Engine Mounting Structure"), for example suspends a turboengine below the wing of the aircraft, or else mounts this turboengine above this same wing.

PRIOR ART

Such an attachment pylon is in fact provided to constitute the linkage interface between an engine such as a turbojet engine and a wing of the aircraft. It transmits to the structure of this aircraft the forces generated by its associated turbojet engine, and also allows flow of fuel, electrical systems, hydraulics, and air between the engine and the aircraft.

To ensure transmission of forces, the pylon comprises a rigid structure, often of the "caisson" type, that is, formed by assembling the upper and lower longerons and two lateral panels connected together by means of transversal grooves.

On the other hand, the pylon is fitted with an engine-mounting system interposed between the turbojet engine and the rigid structure of the pylon, this system comprising overall at least two engine attachments, generally front attachment and a rear attachment.

Also, the assembly system comprises a thrust force collection device generated by the turbojet engine. In the prior art, this device for example takes the form of two lateral connecting rods connected on the one hand to a rear part of the fan casing of the turbojet engine, and on the other hand to the rear engine attachment fixed on the casing of the latter.

In the same way, the attachment pylon also comprises a second assembly system interposed between the rigid structure of this pylon and the wing of the aircraft, this second system usually being composed of two or three attachments.

Finally, the pylon is provided with a secondary structure ensuring segregation and maintenance of systems while supporting aerodynamic faring.

In the embodiments of the prior art, the engine-mounting system comprises a rear engine attachment whereof the body is directly attached on the lower longeron of the caisson, with which it is in contact. In fact, the attachment body, also called a transversal beam, has a horizontal fixing surface plated against a horizontal fixing surface of the rigid structure. The horizontal fixing interface formed by these two surfaces extends therefore according to a plane defined by the longitudinal and transversal directions of the attachment pylon, and is generally located at the level of an external surface of the lower longeron of the caisson in the case where the engine is to be suspended beneath the wing of the aircraft.

This configuration causes various drawbacks, including that associated with directly connecting the beam of the rear engine attachment to the lower longeron. In fact, this implies that it is necessary to bring the caisson as close as possible to the casing of the engine, to properly ensure placing of this rear engine attachment which must not have an overly excessive vertical variable. Now, this configuration causes the lower part of the caisson to constitute a considerable obstacle in the flow zone of the secondary flow, and therefore cause elevated aerodynamic perturbation, due in particular to the substantial width of the essentially sized caisson as a function of the wing interface it supports. The substantial aerodynamic perturbation encountered to the right of the rear engine attachment causes drag, resulting in performance losses of the aircraft.

Also, the fact of having to bring the caisson close to the engine casing usually requires modification of the geometry of this same caisson which is no longer capable of keeping a flat lower face. This is inevitably translated by production constraints due to the complex assembly process of designing the lower part of the caisson, and by penalising oversizing of the attachment pylon in terms of overall mass.

OBJECT OF THE INVENTION

The aim of the invention therefore is to propose an attachment pylon for aircraft engine at least partially rectifying the disadvantages mentioned hereinabove, relative to executions of the prior art.

For this to happen, the object of the invention is an aircraft engine attachment pylon, said pylon comprising a rigid structure forming caisson and an engine-mounting system mounted fixed on said rigid structure and comprising especially a rear engine attachment comprising an attachment body on which is articulated at least one shackle, said engine-mounting system further comprising a thrust force collection device generated by the engine, comprising two lateral connecting rods connected by their rear end to a crossbar mounted articulated on a crossbar support, itself mounted fixed on said attachment body of the rear engine attachment.

According to the invention, it further comprises an intermediate piece interposed between said crossbar support and said caisson, a first shear slug passing through a first interface fixing plane between said intermediate piece and said caisson, and a second shear slug passing through a second interface fixing plane between said intermediate piece and said crossbar support. Also, in side elevation, the intersection point between an axis of the first pin and the first interface plane, and the intersection point between an axis of the second pin and the second interface plane, are located on the common axis of said two lateral thrust force collection connecting rods.

Accordingly, in the non-limiting case where the engine is to be suspended under the wing of the aircraft, the proposed invention overall offsets the rear engine attachment downwards relative to the caisson, due to the intermediate piece lodged between the lower caisson longeron and the crossbar support carried by the rear engine attachment body.

Adding this intermediate piece relative to the embodiments of the prior art offers countless advantages, including that of moving this same caisson away from the engine suspended on the pylon. Consequently, the thermal conditions undergone by this caisson are less substantial than those found previously in embodiments where the fixing interface of the rear engine attachment, provided on its beam, was located directly on the lower longeron. This easing of thermal conditions therefore enables the use of materials less sensitive to heat to produce the rigid caisson, such as composite materials comprising a mix of resin and glass and/or carbon fibres. In such a case, a considerable gain in mass for assembly of the attachment pylon can be derived advantageously.

In addition, it is noted that the proposed invention gains an advantage in terms of aerodynamic performance, given that the lower part of the caisson is at present remote from the axis engine, such that the flow zone of the secondary flow is substantially liberated relative to the configuration found previously. The aerodynamic perturbation to the right of the rear engine attachment is now diminished, this advantage being all the more consequential since the width of the intermediate piece is less than that of the caisson. However, it is noted that the caisson and the intermediate piece displacing the rear engine attachment body could have the same width, without departing from the scope of the present invention.

On the other hand, it is of course understood that the geometry of the caisson is no longer influenced by the necessity of being moved close to the engine casing, since this function can be wholly assured by the intermediate displacement piece attached fixed to this caisson. The geometry of the latter can consequently be considerably simplified, as for its production, especially in providing a lower caisson surface, plane from one end to the other of the rigid structure, according to the longitudinal direction thereof. Its mass is then reduced and perfectly optimised to the extent where the lower part of the caisson no longer advantageously exhibits offset of significant width exclusively intended to be brought closer to the engine casing.

Also, alignment of the first and second shear slugs in the axis of the connecting absorbing rods, also corresponding preferably to the plane of the crossbar in side elevation, causes no transversal parasite moment associated with thrust force collection. These forces can then transit successively via the absorbing connecting rods, the crossbar, the axis of articulation of the crossbar, the crossbar support, the second shear slug, the intermediate piece, the first shear slug, then finally the caisson.

Said rear engine attachment is preferably provided on each side of said caisson with at least one lateral fitting in contact with a lateral panel of said caisson and mounted fixed on the latter, said lateral fitting comprising a fixing surface in contact with a fixing surface provided on the rear engine attachment body, said fixing surface of the fittings being located beyond said caisson in the direction of said at least one shackle. Accordingly, in the case where the engine is to be suspended under the wing of the aircraft, and where said caisson is formed by assembling an upper longeron, a lower longeron, two lateral panels and transversal grooves connecting said longerons and panels, said fixing surface of the lateral fittings and said rear engine attachment body are located under and at a distance from said lower longeron.

Said intermediate piece preferably has transversal abutment surfaces in contact with said lateral fittings, said transversal abutment surfaces being located beyond said caisson in the direction of said at least one shackle. These stop surfaces are judiciously provided to meet the configuration overhanging the lateral fittings fitted at one of their ends on the caisson.

Said rear engine attachment preferably also comprises at least one vertical shear slug successively passing through the attachment body, said intermediate piece, and a longeron of said caisson, said shear slug being capable of ensuring thrust force collection exerted according to a transversal direction of said pylon.

According to another preferred embodiment of the present invention, a secondary fitting mounted fixed on said caisson and having a transversal abutment surface in contact with at least one of said lateral fittings is provided on each side of said intermediate piece, said transversal abutment surfaces being located beyond said caisson in the direction of said at least one shackle. Accordingly, the transversal stop function is no longer ensured by the intermediate piece, the design of which can be simplified, but by secondary fittings provided for this purpose. Also, it is preferably provided that the secondary fitting is mounted on said rear engine attachment body by means of a transversal connecting axis.

In such a case, and when said rear engine attachment is provided, on each side of said caisson, with two longitudinally spaced lateral fittings, arranged in contact with the lateral panel of said caisson and mounted fixed on the latter, it is preferably provided that said transversal connecting axis is located between the two longitudinally spaced lateral fittings. This considerably simplifies installing the engine assembly, given that when the engine is brought close to the pylon, it suffices to connect the secondary fittings on the rear engine attachment body to introduce the transversal connecting axis from the exterior of the caisson between the two lateral fittings to the side of the relevant caisson. The operator consequently has satisfactory access to carry out such assembly, with no particular tool being required.

The fixing surface of each of the lateral fittings of the rear attachment preferably takes the form of a flat surface oriented according to a plane defined by the transversal direction and a longitudinal direction of the pylon.

Preferably, each of the two lateral fittings of the rear attachment is made monobloc, and preferably of titanium.

It is indicated that the rear attachment is preferably designed so as to define two half-fasteners, each capable of ensuring thrust force collection exerted according to a vertical direction of the pylon.

Said first and second shear slugs are preferably traversed by a plane of symmetry vertical and longitudinal to said pylon, a plane which also preferably passes through the axis of articulation of the crossbar.

Another aim of the invention is an aircraft engine assembly comprising a pylon such as that just described, as well as an engine fixed on this pylon.

Finally, an aim is an aircraft comprising at least one such engine assembly.

Other advantages and characteristics of the invention will emerge from the following detailed non-limiting description.

BRIEF DESCRIPTION OF THE DRAWINGS

This description will be given with respect to the attached drawings, in which.

DETAILED DESCRIPTION OF PREFERRED EMBODIMENTS

Figure 1:
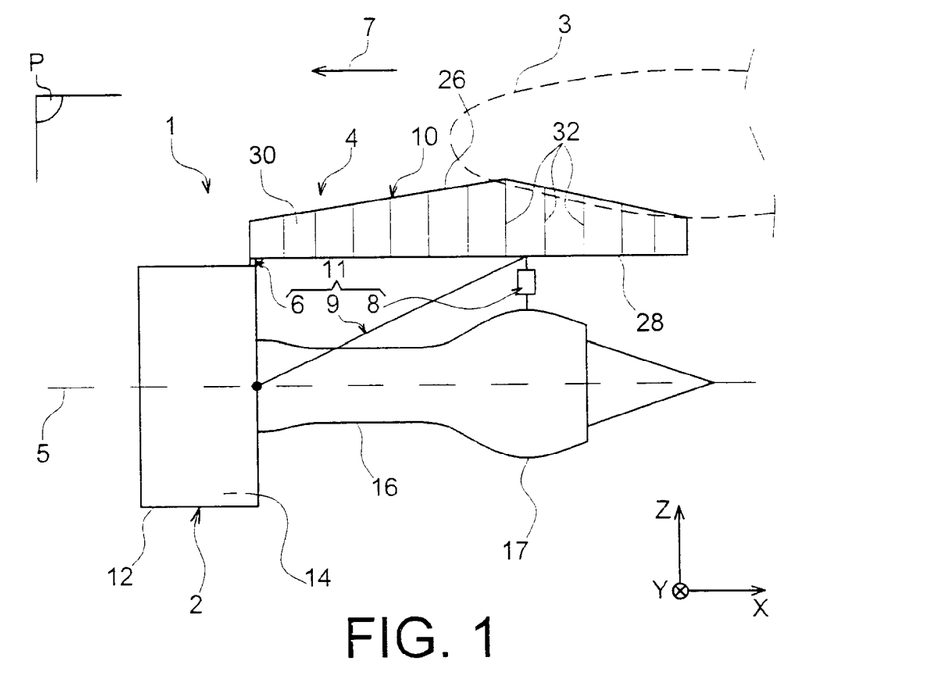
FIG. 1 illustrates a partially schematic side view of an aircraft engine assembly, comprising an attachment pylon according to a preferred embodiment of the present invention.

In reference to FIG. 1, this shows an aircraft engine assembly 1 to be fixed under a wing 3 of this aircraft, this assembly 1 forming an object of the present invention being provided with an attachment pylon 4 in the form of a preferred embodiment of the present invention.

Overall, the engine assembly 1 comprises an engine such as a turbojet engine 2 and the attachment pylon 4, the latter being especially fitted with a rigid structure 10 and an engine-mounting system 11 composed of a plurality of engine attachments 6, 8 and a thrust force collection device 9 generated by the turbojet engine 2, the assembly system 11 therefore being interposed between the engine and the abovementioned rigid structure 10, the latter also being called a primary structure. By way of indication, it is noted that the assembly 1 is intended to be enclosed by a nacelle (not shown in this figure), and that the attachment pylon 4 comprises another series of attachments (not shown) ensuring suspension of this assembly 1 under the wing of the aircraft.

Throughout the following description, by convention, X is called the longitudinal direction of the pylon 4 which is also equivalent to the longitudinal direction of the turbojet engine 2, this direction X being parallel to a longitudinal axis 5 of this turbojet engine 2. On the other hand, Y is called the direction oriented transversally relative to the pylon 4 and also equivalent to the transversal direction of the turbojet engine 2, and Z is called the vertical direction or of the height, these three directions X, Y and Z being orthogonal to one another.

On the other hand, the terms "front" and "rear" are to be considered relative to a direction of advance of the aircraft found following the thrust exerted by the turbojet engine 2, this direction being shown schematically by the arrow 7.

FIG. 1 shows that only the collection device 9, the engine attachments 6, 8, and the rigid structure 10 of the attachment pylon 4 are shown. The other constitutive elements, not shown, of this pylon 4, such as the attachment means of the rigid structure under the wing of the aircraft, or even the secondary structure ensuring segregation and maintenance of the systems while supporting aerodynamic faring, are classic elements identical or similar to those encountered in the prior art, and known to the expert. Consequently, no detailed description thereof will be given.

The turbojet engine 2 has at the front of a large-size fan casing 12 delimiting an annular fan duct 14, and towards the rear comprises a central casing 16 of smaller size, enclosing the core of this turbojet engine. Finally, the central casing 16 extends to the rear via an ejection casing 17 of larger size than that of the casing 16. The casings 12, 16 and 17 are naturally joined together.

As evident from FIG. 1, the system 11 is constituted by a front attachment engine 6, a rear engine attachment 8 actually forming two rear half-fasteners, and an attachment 9 forming a thrust force collection device generated by the turboengine 2. As shown schematically in FIG. 1, this device 9 takes the form of two lateral connecting rods (one being visible due to the side view) connected on the one hand to a rear part of the fan casing 12, and on the other hand to a crossbar mounted on the rear attachment 8, as will be specified hereinbelow.

The front attachment engine 6 is attached to the fan casing 12, and is designed to be able to absorb forces generated by the turbojet engine 2 according to the directions Y and Z, by means of shackles/connecting bars. By way of indication, this front attachment 6 preferably penetrates a circumferential end portion of the fan casing 12.

The rear engine attachment 8 constitutes a particular feature of the invention and will be specified in greater detail in reference to the following figures. It is overall interposed between the ejection casing 17 and the rigid structure 10 of the pylon. As such it is designed to form two half-fasteners placed symmetrically relative to a plane P defined by the axis 5 and the direction Z, each of these half-fasteners being designed to be able to absorb forces generated by the turbojet engine 2 according to the direction Z, but not those exerted according to the directions X and Y. However, this rear attachment can also be capable of absorbing, with a more central portion, forces generated by the turbojet engine 2 according to the direction Y, such as shown in FIG. 2.

Figure 2:
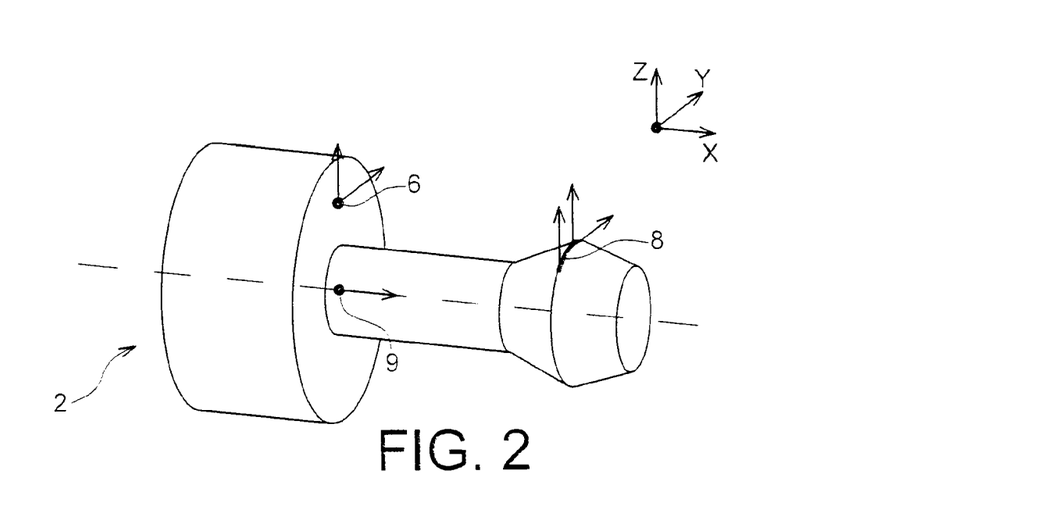
FIG. 2 illustrates a view outlining thrust force collection made by each of the engine attachments of the assembly shown in FIG. 1.

In this way, as shown schematically in FIG. 2, thrust force collection exerted according to the direction X is performed by means of the device 9, while thrust force collection exerted according to the direction Y is performed by means of the front attachment 6 and of the central portion of the rear attachment, and thrust force collection exerted according to the direction Z is performed conjointly by means of the front attachment 6 and the two rear half-fasteners.

On the other hand, absorbing the torque exerted according to the direction X is performed vertically by means of the two half-fasteners of the attachment 8, absorbing the torque exerted according to the direction Y is performed vertically by means of the two half-fasteners of the attachment 8 conjointly with the attachment 6, and absorbing the torque exerted according to the direction Z is performed transversally by means of the central portion of the attachment 8, conjointly with the attachment 6.

Still in reference to FIG. 1, it is evident the structure 10 has the form of a caisson extending in the direction X, this caisson also being called torsion caisson. It is classically formed by an upper longeron 26 and a lower longeron 28, and by two lateral panels 30 (only one shown in FIG. 1) both extending according to the direction X and substantially in a plane XZ. Inside this caisson, transversal grooves 32 arranged according to planes YZ and longitudinally spaced reinforce the rigidity of the caisson. It is noted by way of indication that the elements 26, 28 and 30 can each be made monobloc, or else by assembling linking sections, which can optionally be slightly inclined relative to each other. However, one of the particular features here is that the lower longeron 28 extends in a plane inclined relative to the horizontal, over its entire length, as shown in FIG. 1. The inclination is such that the lower longeron 28, parallel to the direction Y, moves closer to the axis 5 by going rearwards with the aim of moving closer to the ejection casing 17 so as to place the rear engine attachment 8, which all the same remains offset downwards relative to this longeron 28, as will be detailed hereinbelow. The assembly of elements forming the caisson is preferably made of composite materials comprising a mix of resin and glass and/or carbon fibres.

In reference to FIGS. 3 to 6, these show the rear engine attachment 8 whereof some elements have been voluntarily omitted, for clarity. As will be detailed later, it is noted that the rear engine attachment 8 cooperates closely with the thrust collection device 9.

The part of the attachment 8 forming the two half-fasteners rear ensuring each uniquely thrust force collection exerted according to the direction Z, and being arranged symmetrically relative to the abovementioned plane P will be described first.

Since the two rear half-fasteners are therefore identical, only the right one viewed from the rear to the front, namely the one the plane vertical P1 passes through parallel to the plane of symmetry P, will be detailed hereinbelow. Overall, the latter comprises a lateral fitting 34 preferably having a plane of symmetry oriented according to the directions Y and Z, this fitting 34 being attached fixed and directly on the outer surface of the associated lateral panel 30 of the caisson, by means of an inner surface 36.

The fitting 34 extends vertically on the lateral panel 30 on which it is attached, for example fixed by bolting/fish-plating, and extends downwards beyond the lower longeron 28, in the direction of the engine. It therefore terminates in overhang by a fixing plate 37 defining a fixing surface 38 in contact with a fixing surface 40 provided on a body 42 of the rear engine attachment, equivalent to a transversal beam made monobloc.

The surfaces in contact 38 and 40, arranged at a distance from the lower longeron 28 in the direction of the engine, constitute a fixing interface taking the form of a flat surface oriented according to a plane XY.

Figure 6:
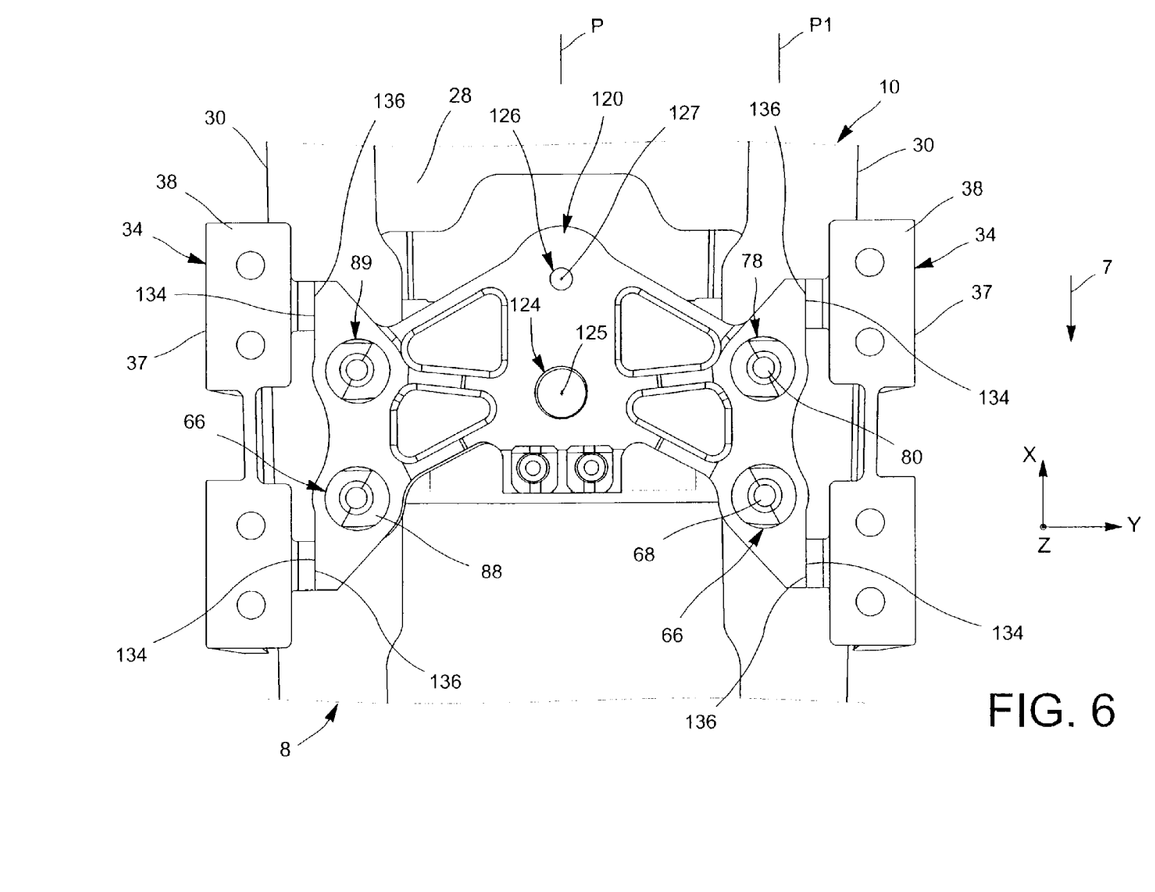
FIG. 6 illustrates a plan view from below of the rear part of the assembly system shown in FIGS. 3 to 5.

On the other hand, the lateral fitting 34 also projecting laterally from the caisson, as evident in FIG. 6, comprises reinforcing grooves 44 oriented according to parallel planes YZ.

Each lateral fitting 34, preferably made monobloc and from titanium, is therefore fixed to the rear attachment body 42 placed transversally below and at a distance from the lower longeron 28. This body 42, having also the plane P as plane of symmetry, is therefore in contact with the two coplanar fixing surfaces 38 arranged on either side of the caisson, by means of its two fixing surfaces 40 also coplanar, respectively in contact and opposite in pairs with the surfaces 38. Fixing is carried out preferably by means of vertical bolts (not shown) passing through the fixing plate 37, and an upper part of this body 42.

The body 42 comprises a clevis 50 forming an integral part of the right rear half-fastener, on which a shackle 52 is articulated by means of an axis oriented according to the direction X. By way of indication, a second axis 56 likewise oriented according to the direction X is also provided at the level of a lower end of the shackle 52, so as to articulate the latter on a fitting/clevis (not shown) attached to the casing of the turbojet engine 2. Consequently, it can therefore be understood that each rear half-fastener comprises the articulated shackle 52, the clevis 50 and the fitting 34, the two clevises of the two half-fasteners also being connected within the same rear attachment body 42, preferably made monobloc.

It emerges from the preceding description that the rear attachment 8 forms two half-fasteners, each capable of ensuring thrust force collection exerted according to the direction Z. Now, in a preferred embodiment of the present invention it is provided that the rear attachment 8 is also capable of ensuring thrust force collection exerted according to the direction Y.

For this to happen, still in reference conjointly to FIGS. 3 to 6, it is provided that the rear engine attachment 8 also comprises a shear slug 66 oriented according to the direction Z, this pin 66 being provided to ensure thrust force collection exerted according to a direction Y, and more particularly to enable these forces to pass between the rear attachment body 42 and the rigid structure 10 of the attachment pylon.

The pin 66 comprises an upper end 68 located at the level of one of the transversal grooves 32 in the shape of a frame, this end 68 also occupying a protruding position inside this frame, lending it easy access. The pin 66 is prolonged downwards, passing successively through the lower part of the relevant groove 32 and the lower longeron 28, then an intermediate piece attached under this longeron, the particular feature of which will be detailed later. It then comprises a lower end 70 projecting downwards relative to the longeron 28 of the caisson, and being lodged in an orifice 72 of the rear attachment body 42. It is therefore the contact between the surface of this end 70 and that of the orifice 72 which ensures thrust force collection according to the direction Y. By way of indication, it is noted that the orifice 72 has an overall oval form substantially complementary to that of the shear slug 66, and takes the form of a blind hole made in the upper part of the attachment body 42.

Figure 5:
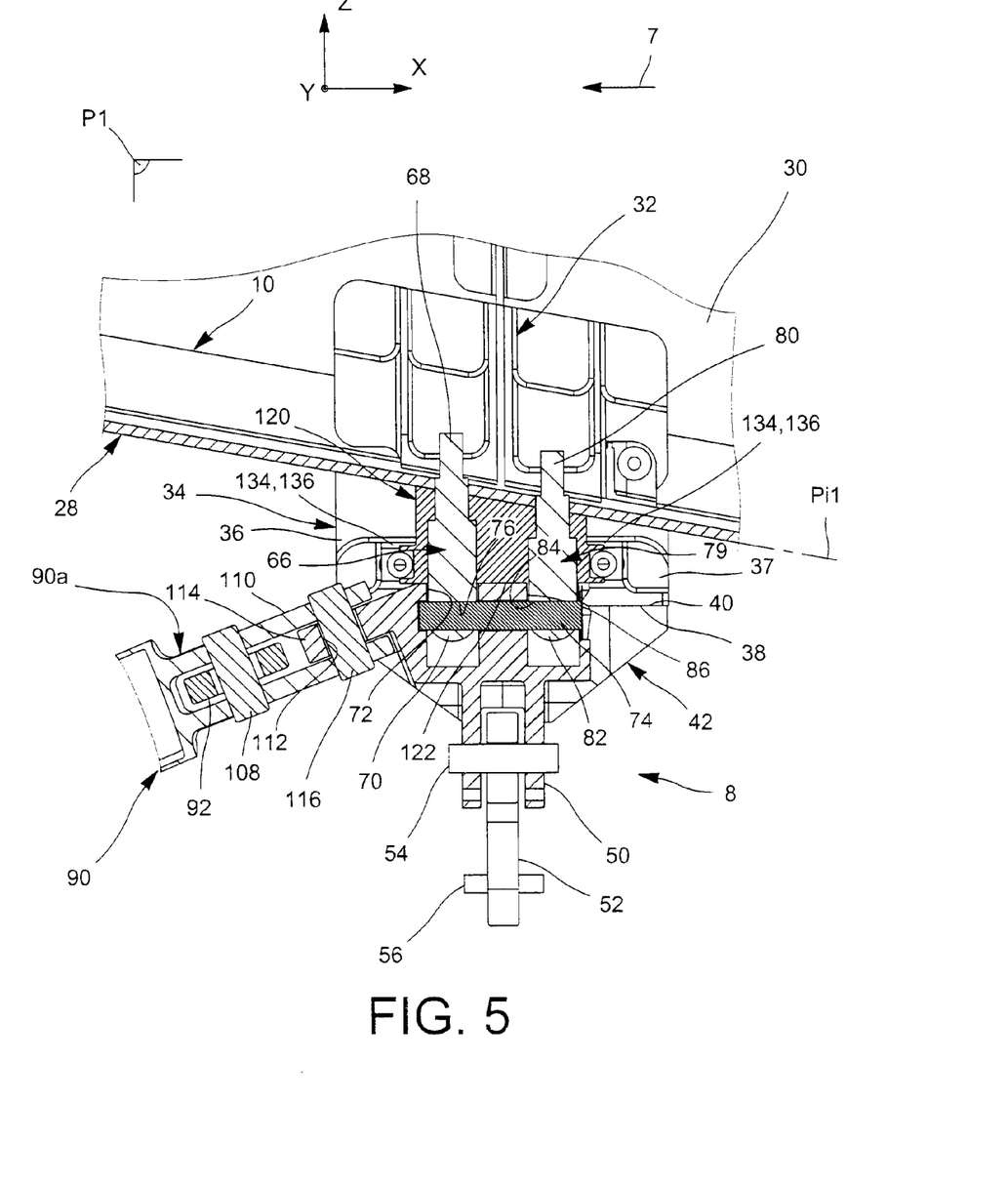
FIG. 5 illustrates a view in longitudinal section passing through the plane P1 of FIG. 3.

Also, a first split pin 74 seen in FIG. 5 is preferably provided, successively passing through a part front of the body 42, a bore 76 made in the lower end 70 of the pin 66, and a central part of the same body 42.

With this particular arrangement in which the split pin 74 taking the form of an axis is preferably oriented according to the direction X, cooperation between the bore 76 and the split pin 74 consequently absorbs the forces exerted according to the direction Z in case of failure/breakage of one of the two lateral fittings 34, and in particular that belonging to the right rear half-fastener, due to the proximity between the pin 66 and this right half-fastener. This advantageously ensures a safety function called "Fail Safe" for transmission of forces according to the direction Z, without as such substantially complicating the design of the body 42. Also, it is noted that for this path of forces to be operating solely during failure/breakage of the right rear half-fastener, functional play is provided between the split pin 74 and the bore 76.

To reinforce this "Fail Safe" function associated with the right rear half-fastener, the rear engine attachment 8 further comprises an attached pin 78 aligned with the shear slug 66 in the direction of the split pin X, therefore preferably in the direction X. Of course, the direction of the split pin 74 could be different, while remaining preferably in a plane XY, without departing from the scope of the invention.

This pin 78 has a design similar to that of the pin 66 described hereinabove. Accordingly, it comprises an upper end 80 also located at the level of the abovementioned transversal groove 32, this end 80 occupying a positioning projecting inside the frame formed by this groove, which makes for easy access. The pin 78 then extends downwards by successively passing through the lower part of the relevant groove 32 and the lower longeron 20, to then pass through the intermediate piece. It also comprises a lower end 82 projecting downwards relative to the longeron 28 of the caisson, and being housed in an orifice 86 of the rear attachment body 42. Still so as to make the engine attachment system isostatic and to prevent the first attached pin 78 from absorbing forces exerted according to the direction Y, play is preferably provided between the surface of the end 82 and that of the orifice 86. Here, too, it is noted that the orifice 86 has an overall oval form substantially complementary to that of the attached pin 78, and takes the form of a blind hole made in the upper part of the attachment body 42.

As is evident in FIG. 5, the rear attachment 8 is designed such that the split pin 74 exiting from the central part of the body 42 then successively passes through a bore 84 made in the lower end 82 of the pin 78, as well as a rear part of the same body 42, to then terminate outside the latter. Here, too, it is noted that for the path of forces constituted by the elements 74 and 82 to be operating solely during failure/breakage of the right rear half-fastener, functional play is provided between the split pin 74 and the bore 84.

The rear attachment 8 comprises an assembly similar to that just described, but which is associated with the left rear half-fastener, especially with the aim of ensuring the "Fail Safe" safety function for transmission of forces according to the direction Z normally ensured by this left rear half-fastener. In fact, a shear slug 88 and an attached pin 89 respectively identical to the pins 66 and 78 are also provided, these pins 88, 89 being provided with lower ends housed in the body 42 and traversed by a second split pin (not shown). Accordingly, it must be understood that the pions/split pin assembly associated with the left rear half-fastener is symmetrical relative to the plane P of the pions/split pin assembly associated with the right rear half-fastener, the only difference between these two assemblies being the desired play between the shear slug 88 and its associated orifice (not shown) made in the attachment body rear. This play is yet once again provided here such that the pin 88 uniquely ensures the "Fail Safe" function for transmission of forces exerted according to the direction Y, in case of failure occurring at the level of the first shear slug 66.

Figure 3:
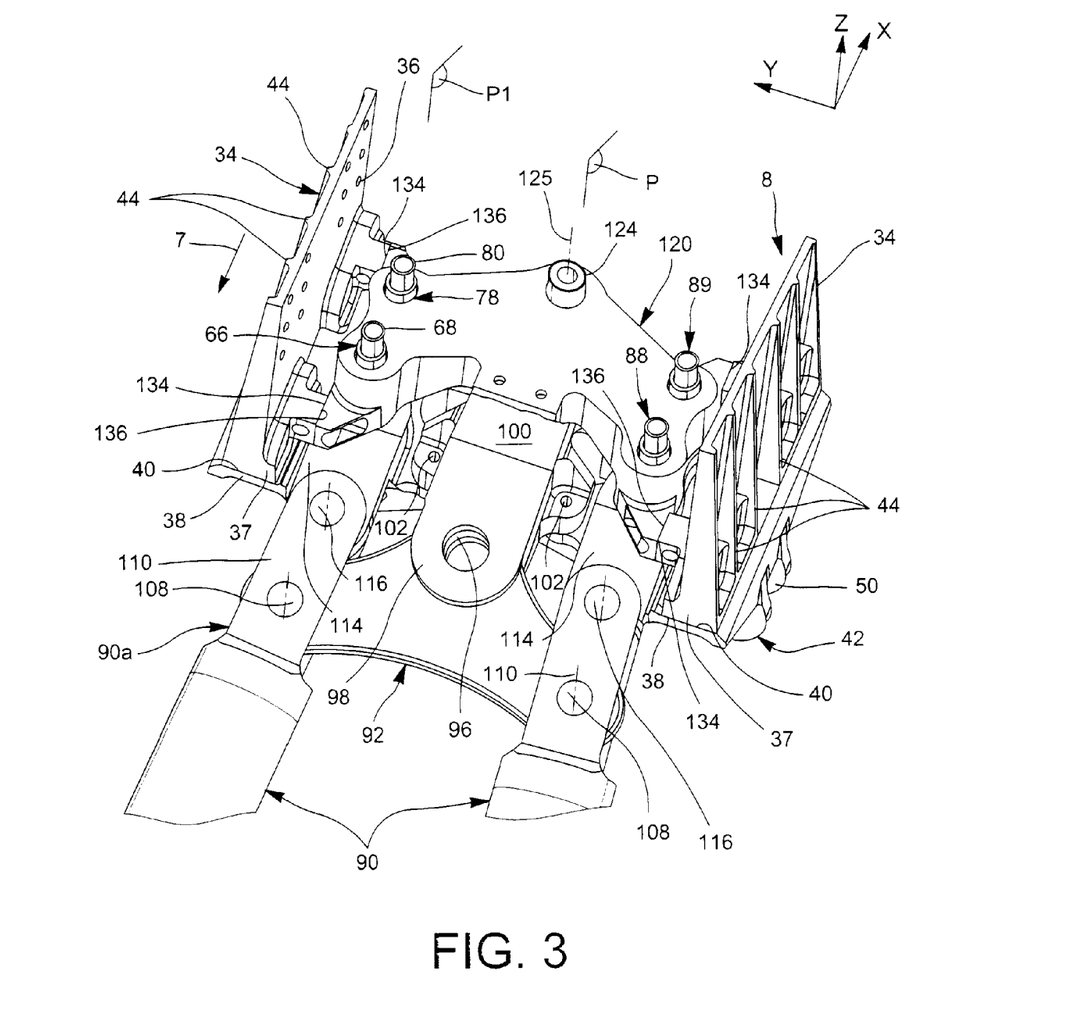
FIG. 3 illustrates a partial detailed perspective view of the rear part of the engine-mounting system, belonging to the pylon shown in FIG. 1.
Figure 4:
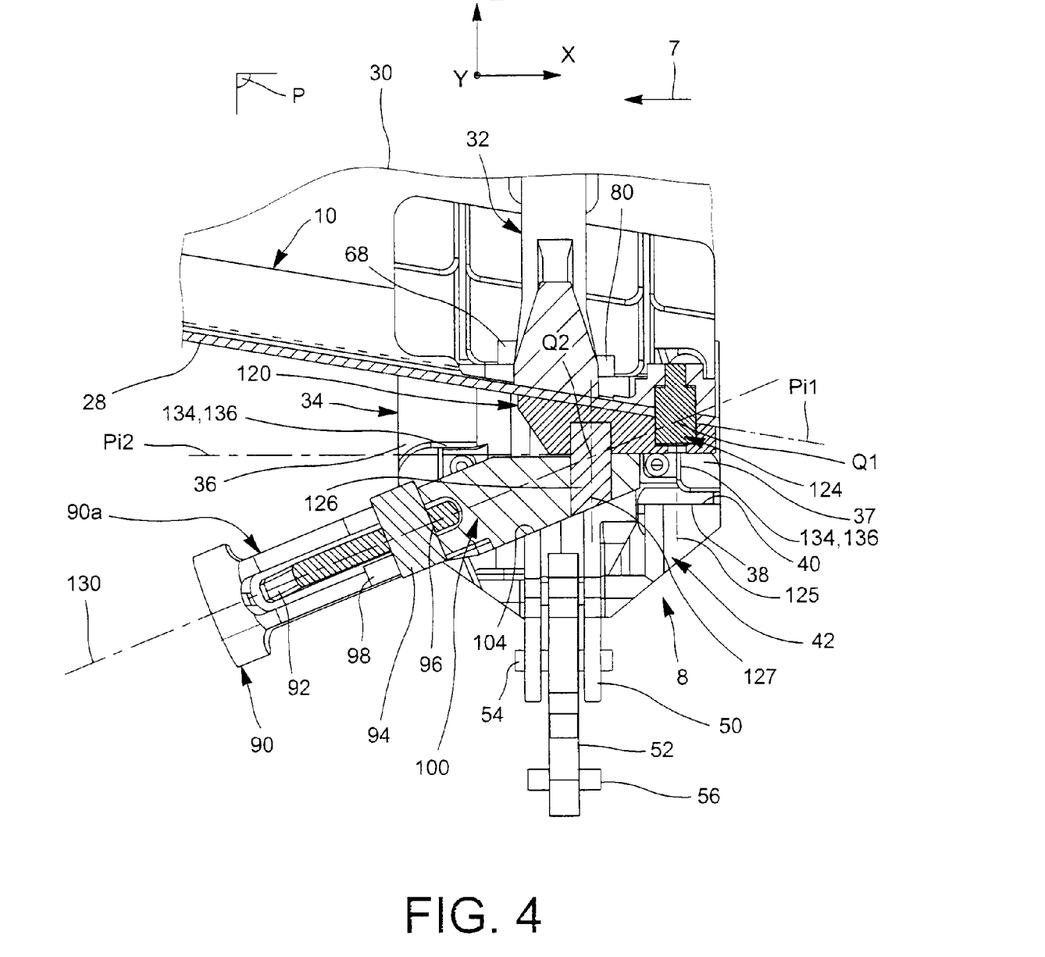
FIG. 4 illustrates a view in longitudinal section passing through the plane of symmetry P of FIG. 3.

In reference to FIGS. 3 to 5, one of the particular features of the present invention is evident, relative to the connecting of the thrust force collection device 9 to the rear engine attachment 8 and on the caisson 10. This connection is specific, in particular due to displacement of the body 42 at a distance from and under the caisson 10, done so as to be able to move this caisson away from the engine 2.

The device 9 overall comprises two lateral thrust force collection connecting rods 90, each of these connecting rods comprising a front end (not shown in these figures) connected to the fan casing 12, for example on or near a horizontal median plane of the turboengine 2.

The two lateral connecting rods 90, arranged on either side of the plane P, each have a rear end 90a connected to a crossbar 92, as will be detailed hereinbelow. The crossbar 92 is coupled to an axis of articulation 94, preferably of the single-axis and not double-axis type, positioned so that the vertical and longitudinal plane P passes through it. This axis of articulation of the crossbar therefore passes through an orifice 96 made in the crossbar 92 itself, and a clevis 98 whereof the two flanks are arranged on either side of the crossbar 92. In this respect, it is noted that this clevis 98 belongs to a crossbar support 100 mounted fixed on the central part of the rear engine attachment body 42, preferably above this central part, which can exhibit a notch 104 provided to house the rear end of the support 100. Fixing is performed for example by means of bolts passing through orifices 102 of the crossbar support 100. Accordingly, the latter is located between the caisson and the beam 42 in the vertical direction, while being kept at a distance from this same caisson.

A first mechanical linkage, constituting the linkage by which thrust forces are intended to transit in normal mode, is made by means of an axis of articulation 108 connecting the rear end 90a to one of the lateral ends of the crossbar 92. To complete this first mechanical linkage a second mechanical linkage is provided with play on the rear end 90a of each connecting rod 90, the play serving to make this linkage inactive as long as its first associated linkage does not undergo breakage/failure. It is noted that the second linkage is designed to be able to absorb forces in case of breakage/failure, at the same time in thrust mode and in thrust inverter mode.

For this to happen, the second mechanical linkage is made by means of a clevis 110 formed on the end 90a of the connecting rod at the rear of the first linkage, and an orifice 112 made in a end front of a support tongue 114 housed between the two flanks of this same clevis 110. Also, an axis of articulation 116 passes through the clevis 110 and the orifice 112 with play, this axis 116, preferably single, for example being substantially inclined according to the direction Z and parallel to the axis 108 and the axis 94. As is evident from FIG. 5, the axis 108 of the first linkage also passes through the abovementioned clevis 110.

The support tongue 114 is preferably located substantially in the extension of the axis of its associated connecting rod 90, which ensures continuity in thrust force collection operating in failure/breakage mode. Also, the rear end of each of the two support tongues 114 comes out of the beam 42 of the rear attachment 8, with which these tongues are preferably made monobloc. Of course, these tongues 114 could be made separately and attached fixed to the beam 42, without departing from the scope of the invention.

In addition, it is indicated that in failure/breakage mode of the crossbar 92 or its associated axis 94, forces according to the longitudinal direction coming from the lateral connecting rods 90 are transmitted to the rigid structure 10 by means of the second mechanical linkages, via the support tongues 114 arranged symmetrically relative to the plane P. In this way, it is noted that forces transiting in the tongues 114 then pass through the abovementioned shear slugs and the intermediate piece which will be described hereinbelow, before being introduced to the caisson 10.

On the other hand, in failure/breakage mode of one of the two absorbing connecting rods 90, forces according to the longitudinal direction are transmitted to the rigid structure by means of the second mechanical linkage of the non-deficient connecting rod 90, via its associated support tongue 114. In these two cases of failure/breakage, the secondary linkage becomes active when its axis 116 makes contact with the end front of the tongue which it passes through.

One of the particular features of the present invention is placing the intermediate piece 120 between the crossbar support 100 and the caisson 10, and therefore also between the beam 42 and this same caisson, according to the direction Z. More precisely, a first interface fixing plane is provided between the intermediate piece 120 and the lower longeron 28 in contact, this plane Pi1 being parallel to the direction Y. Similarly, a second interface fixing plane is provided between the intermediate piece 120 and the crossbar support 100 in contact, this plane Pi2 being also parallel to the direction Y and arranged below the plane Pi1, even though these planes may be inclined relative to one another, as shown. In this respect, it is noted that the abovementioned notch 104 in the central part of the beam 42 effectively houses the crossbar support 100 between the piece 120 and the beam 42, as in FIG. 4, whereas at the lateral ends of the beam 42 and of the intermediate piece 120 these two elements are preferably directly in contact due to the interface referenced 122 in FIG. 5. In other terms, all of the upper surface of the intermediate piece 120 extends in the interface fixing plane Pi1, and therefore remains in contact with the outer surface of the longeron 28, whereas the lower surface of the intermediate piece 120 is combined into a central portion extending in the interface fixing plane Pi2 and therefore in contact with the crossbar support 100, and two portions of lateral end extending according to the interface 122 distinct from the plane Pi2.

To ensure transmission of thrust forces right into the caisson 10, a first shear slug 124 is provided, preferably having a vertical axis 125, passing through the first interface fixing plane Pi1, and a second shear slug 126, preferably having a vertical axis 127, passing through the second interface fixing plane Pi2. Also, the two pins 124, 126 are penetrated by the plane of symmetry P. In reference to FIG. 4, each of the two shear slugs 124, 126 passes through, though not necessarily from side to side, only those two pieces in contact which it connects mechanically. By way of indication, the axes 125, 127 correspond to the central axes of the associated pins, and because of this also correspond to the axes of the orifices through which these pins 124, 126 pass.

Accordingly, in normal mode thrust forces transit successively through the absorbing connecting rods 90, the axes of articulation 108, the crossbar 92, the axis of articulation 94 of the crossbar, the crossbar support 100, the second shear slug 126, the intermediate piece 120, the first shear slug 124, the lower longeron 28 and the groove 32 also penetrated by the pin 124.

Also, in side elevation or in longitudinal section, as shown in FIG. 4, the intersection point Q1 between the axis 125 of the first pin 124 and the first interface plane Pi1 taking the form of a straight line, and the intersection point Q2 between the axis 127 of the second pin 126 and the second interface plane Pi2 also taking the form of a straight line, are located on the common axis 130 of the two lateral thrust force collection connecting rods 90.

This specificity of alignment of points Q1 and Q2 according to the axis 130 of the connecting rods 90, equivalent also to the plane of the crossbar 92 in side elevation, advantageously causes no transversal parasite moment associated with thrust force collection, capable of being transmitted to the caisson with the inherent disadvantages. Naturally, the respect of this alignment condition, as well as taking into account the overall geometry of the pylon, in particular the orientation of the connecting rods 90 moving away from the engine axis by moving to the rear, results in providing the first point Q1 at the rear relative to the second point Q2.

Finally, it is indicated that at the level of its two lateral ends the intermediate piece 120 has transversal abutment surfaces 134 opposite the exterior, and therefore arranged according to planes XZ. They are located in contact with the corresponding stop surfaces 136 provided on the lateral fittings 34, oriented internally. Accordingly, these stop surfaces 134, 136 cooperating in pairs are located below the caisson 10, at a distance from the lower longeron. Due to the fact of their positioning they advantageously prevent the lateral fittings 34, in downwards overhang, from shifting laterally inwards, namely towards the plane of symmetry P of the attachment pylon.

Figure 7:
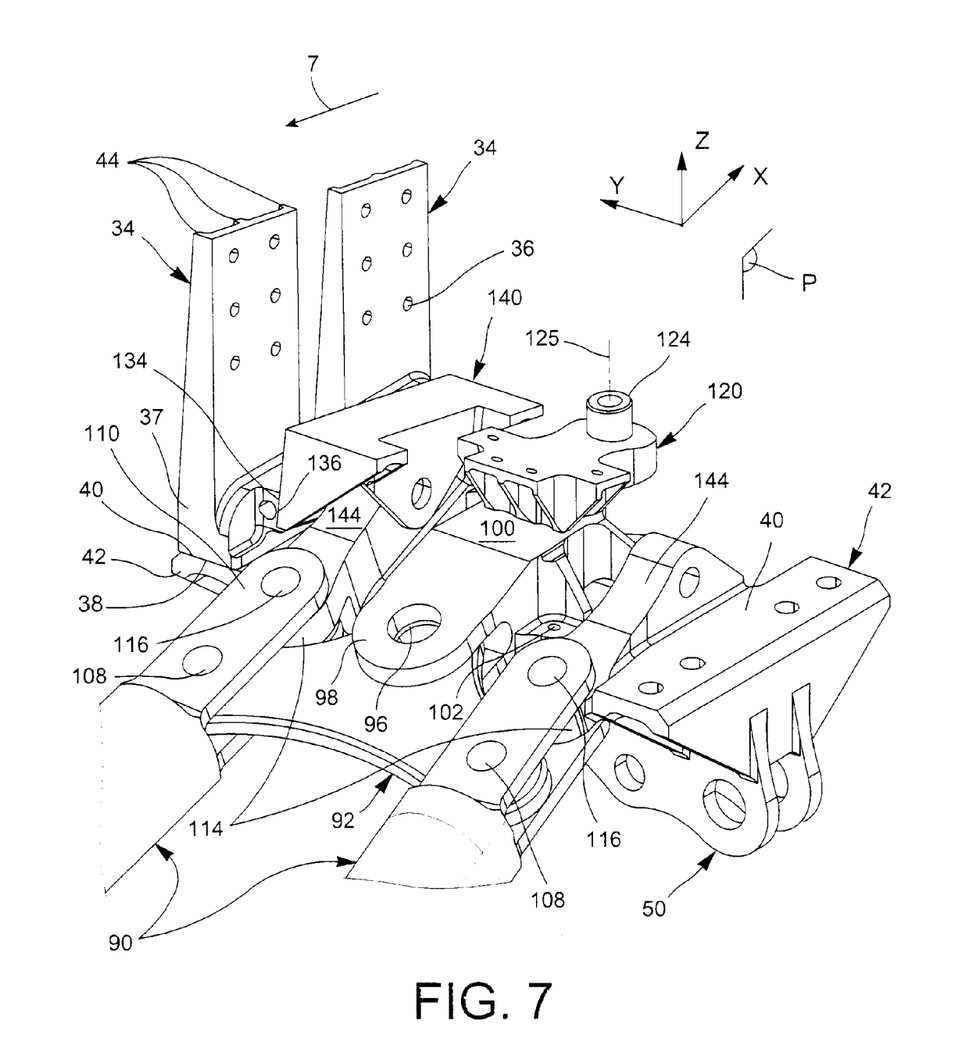
FIG. 7 illustrates a partial detailed perspective view of the rear part of the engine-mounting system, according to another preferred embodiment of the present invention.
Figure 8:
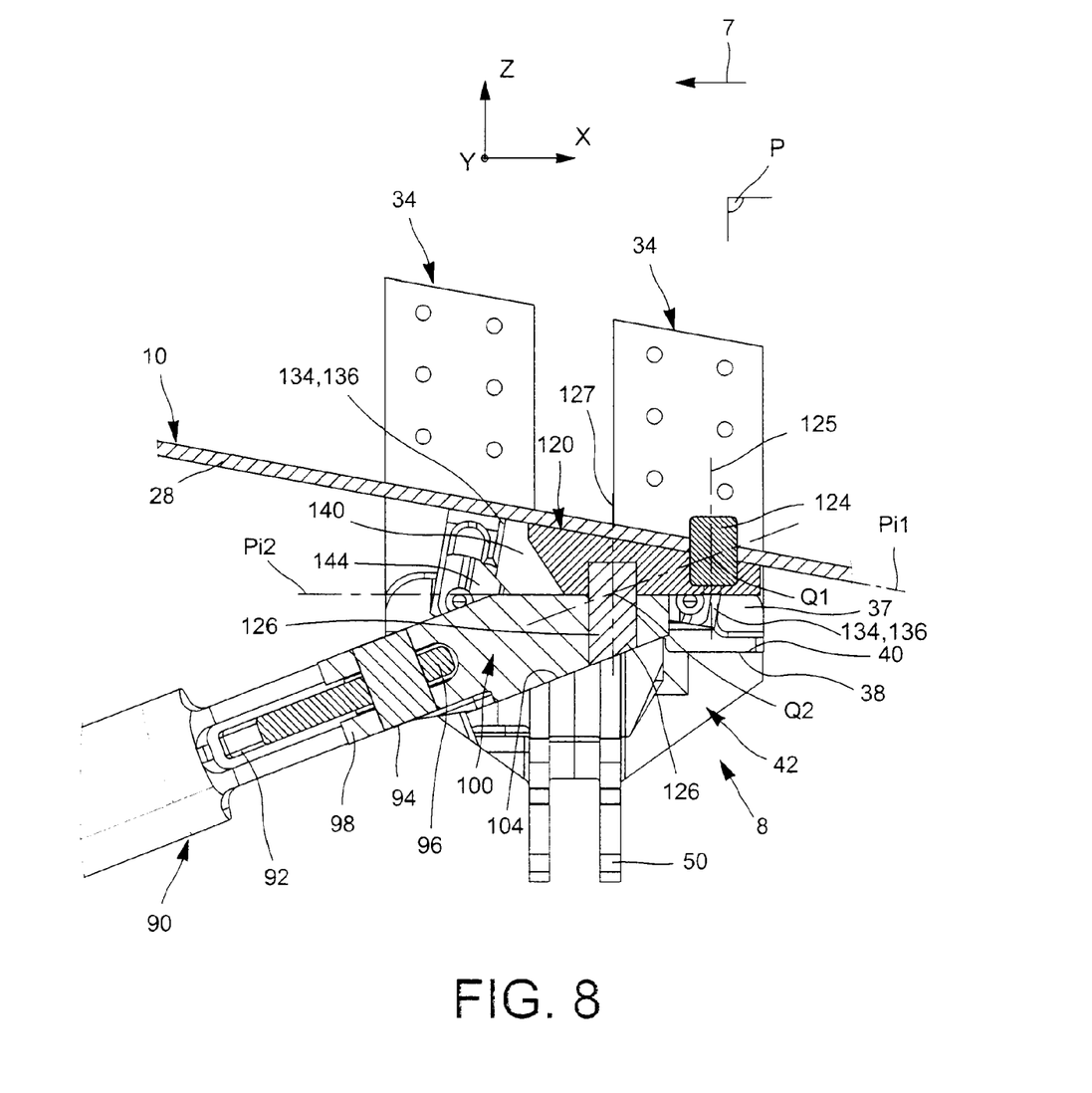
FIG. 8 illustrates a view in longitudinal section passing through the plane of symmetry P of FIG. 7.
Figure 9:
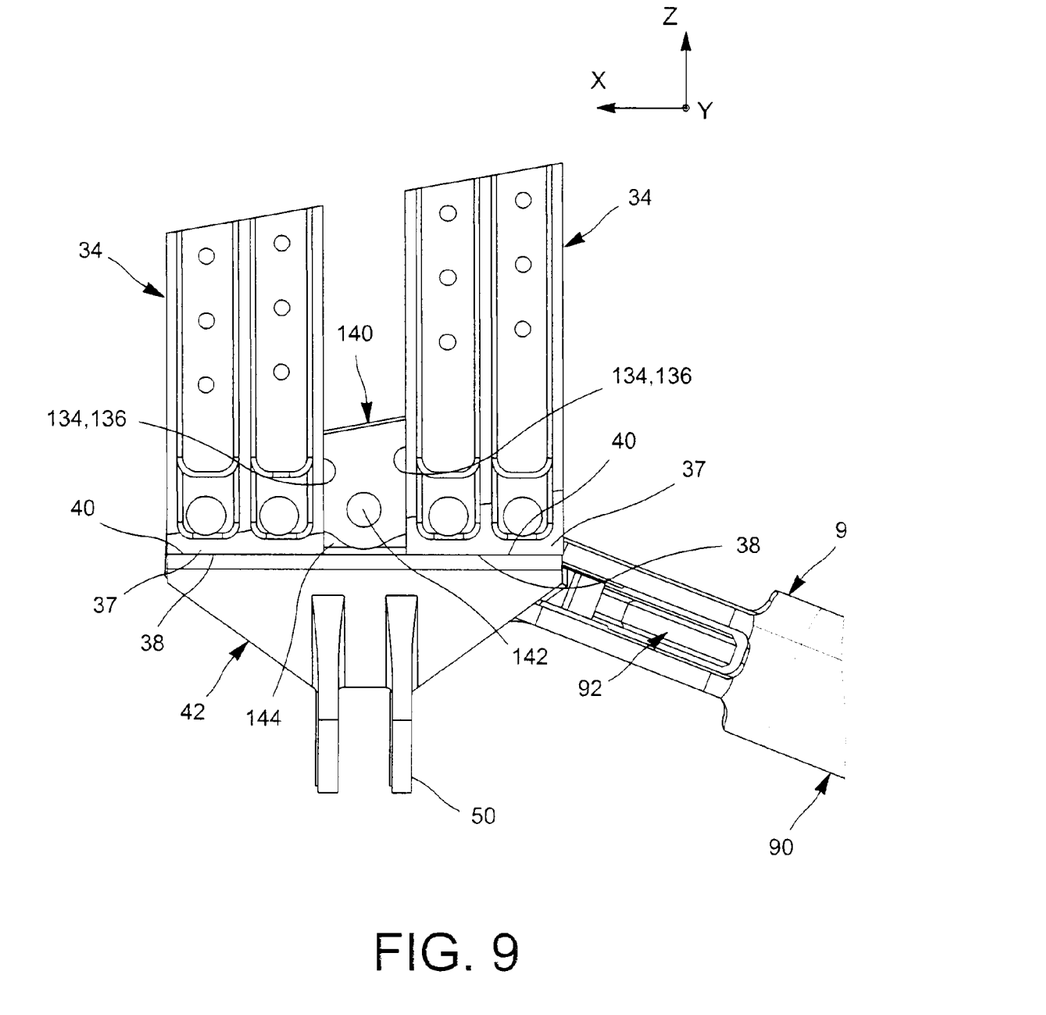
FIG. 9 illustrates a side view of the rear part of the assembly system shown in FIGS. 7 and 8.

In reference now to FIGS. 7 to 9 showing in detail the rear part of the assembly system 11 according to another preferred embodiment of the present invention, it is evident that the latter has a design similar to that shown hereinabove. In this respect, the elements bearing the same reference numerals correspond to identical or similar elements.

The principal difference is in the design of the intermediate piece 120, which no longer has its lateral end portions such as described hereinabove. In fact, the piece 120 is extremely small in transversal dimension, and therefore no longer extends laterally as far as the lateral fittings 34. Accordingly, it is stressed only in thrust force collection normal mode, due to its cooperation with the two shear slugs 124, 126, but is no longer stressed in case of breakage/failure of the collection device 9. Effectively, the path of emergency forces is realised differently, especially in the sense that is no longer provided with vertical shear slugs arranged near the lateral fittings 34, such as the pins 66, 78, 88, 89 described in the previous embodiment. The advantage especially is that it no longer needs access inside the caisson to ensure assembly of these pions.

However, on either side laterally of the intermediate piece 120, a secondary fitting 140 is provided mounted fixed on the lower longeron 28 with which it is in contact, this secondary fitting 140 being mounted on said rear engine attachment body 42 by means of a transversal connecting axis 142, passing through the secondary fitting 140 or the body 42 with play. This initially absorbs forces exerted according to the direction Z in case of failure/breakage of one of the lateral fittings 34, and therefore fulfils the "Fail Safe" safety function for transmission of forces according to the direction Z, made by the shear slugs 66, 78, 88, 89 in the previous embodiment.

Also, it is indicated that in failure/breakage mode of the crossbar 92 or its associated axis 94, the forces according to the longitudinal direction originating from the lateral connecting rods 90 are transmitted to the rigid structure 10 by means of the second mechanical linkages, via the support tongues 114 arranged symmetrically relative to the plane P. The forces transiting in the tongues 114 then pass through the connecting axes 142 and the secondary fittings 140 becoming active, prior to being introduced to the caisson 10 via the longeron 28 and the traversed groove 32. On the other hand, in failure/breakage mode of one of the two absorbing connecting rods 90, forces according to the longitudinal direction are transmitted to the rigid structure by means of the second mechanical linkage of the non-deficient connecting rod 90, via its associated support tongue 114. The path of forces towards the caisson 10 is then the same as that just described.

It is noted here that the rear engine attachment is also designed to absorb forces exerted according to the direction Y, for example identically or similarly to that explained earlier.

In this preferred embodiment, it is these secondary fittings 140 which have the transversal abutment surfaces 134 in contact with the corresponding stop surfaces 136 provided on the lateral fittings 34, as is best evident in FIG. 7.

Finally, two longitudinally spaced lateral fittings 34 are preferably provided on each side of the caisson 10, in place of a single fitting made monobloc in the previous embodiment. This specificity, which could nevertheless be applied to the first embodiment, is of particular interest in the sense that, in side elevation such as shown in FIG. 9, it is then possible to position the transversal connecting axis 142 between the two longitudinally spaced lateral fittings 34.

This simplifies assembly of the engine assembly, given that to connect each of the two secondary fittings 140 on its associated protuberance 144 made monobloc with the rear engine attachment body 42, it suffices to laterally introduce the transversal connecting axis 142 from the side of the relevant caisson, externally to the latter, between the two lateral fittings 140. The operator consequently has adequate access to create such assembly, requiring no access inside the caisson.

It is understood that various modifications can be made by the expert to the attachment pylon 4 for aircraft turbojet engine 2 which has just been described, solely by way of non-limiting example. In this respect, it can especially be indicated whether the pylon 4 has been shown in a configuration adapted for it to be suspended under the wing of the aircraft, this pylon 4 could also be in a different configuration allowing it to be mounted above this same wing.

The invention claimed is:

1. An attachment pylon for an aircraft engine, the pylon comprising:
   a rigid structure forming a caisson;
   an engine-mounting system mounted fixed on the rigid structure and comprising:
   a rear engine attachment comprising an attachment body on which is articulated at least one shackle,
   a thrust force collection device for collecting thrust generated by the engine, comprising two lateral connecting rods connected at their rear end to a crossbar articulately mounted on a crossbar support, the crossbar support fixed on the attachment body of the rear engine attachment,
   an intermediate piece interposed between the crossbar support and the caisson;

a first shear slug passing through a first interface fixing plane between the intermediate piece and the caisson; and a second shear slug passing through a second interface fixing plane between the intermediate piece and the crossbar support, wherein in side elevation the intersection point between a longitudinal axis of the first shear slug and the first interface fixing plane, and the intersection point between a longitudinal axis of the second shear slug and the second interface fixing plane, are both coplanar with the longitudinal axes of the two lateral thrust force collection connecting rods.

2. The attachment pylon as claimed in claim 1, wherein the rear engine attachment is provided on each side of the caisson with at least one lateral fitting in contact with a lateral panel of the caisson and mounted fixed on the caisson, the lateral fitting comprising a fixing surface in contact with a fixing surface provided on the rear engine attachment body, wherein the fixing surfaces are located beyond the caisson in the direction of the at least one shackle.

3. The attachment pylon as claimed in claim 2, wherein the caisson is formed by assembling an upper longeron, a lower longeron, two lateral panels, and transversal grooves connecting the longerons and panels, and wherein the fixing surfaces and the rear engine attachment body are located below and at a distance from the lower longeron.

4. The attachment pylon as claimed in claim 2, wherein the intermediate piece includes transversal abutment surfaces in contact with the lateral fittings, the transversal abutment surfaces being located beyond the caisson in the direction of the at least one shackle.

5. The attachment pylon as claimed in claim 4, wherein the rear engine attachment further comprises at least one vertical shear slug successively passing through the attachment body, the intermediate piece, and a longeron of the caisson, the shear slug ensuring thrust force collection is exerted according to a transversal direction of the pylon.

6. The attachment pylon as claimed in claim 2, further comprising on each side of the intermediate piece a secondary fitting mounted fixed on the caisson and including a transversal abutment surface in contact with at least one of the lateral fittings, the transversal abutment surfaces being located beyond the caisson in the direction of the at least one shackle.

7. The attachment pylon as claimed in claim 6, wherein the secondary fitting is mounted on the rear engine attachment body by a transversal connecting axis.

8. The attachment pylon as claimed in claim 7, wherein the rear engine attachment includes, on each side of the caisson, two lateral fittings longitudinally spaced, arranged to be in contact with the lateral panel of the caisson and mounted fixed on the caisson, the transversal connecting axis being located between the two lateral fittings longitudinally spaced.

9. The attachment pylon as claimed in claim 2, wherein the fixing surface of each of the lateral fittings of the rear engine attachment takes a form of a flat surface oriented according to a plane defined by a transversal direction and a longitudinal direction of the pylon.

10. The attachment pylon as claimed in claim 2, wherein each of the two lateral fittings of the rear engine attachment is made of titanium.

11. The attachment pylon as claimed in claim 1, wherein the rear engine attachment defines two half-fasteners which ensure that thrust force collection is exerted according to a vertical direction with respect to the pylon.

12. The attachment pylon as claimed in claim 1, wherein the first and second shear slugs are traversed by plane of symmetry that is both vertical and longitudinal with respect to the pylon.

13. An engine assembly for an aircraft comprising an attachment pylon as claimed in claim 1, and an engine mounted fixed on the pylon.

14. An aircraft comprising at least one engine assembly as claimed in claim 13.

* * * * *